United States Patent
Shih et al.

(10) Patent No.: US 7,053,358 B2
(45) Date of Patent: May 30, 2006

(54) METHOD AND APPARATUS FOR REAL-TIME DETERMINING COMPATIBILITY OF A WORKING SURFACE WITH AN OPTICAL MOUSE

(75) Inventors: Tzu-Chiang Shih, Taipei Hsien (TW); Chen-Ming Chang, Taipei (TW); Chin-Lung Lai, Taipei Hsien (TW)

(73) Assignee: Primax Electronics Ltd., Taipei (TW)

( * ) Notice: Subject to any disclaimer, the term of this patent is extended or adjusted under 35 U.S.C. 154(b) by 243 days.

(21) Appl. No.: 10/707,339

(22) Filed: Dec. 5, 2003

(65) Prior Publication Data

US 2005/0045811 A1 Mar. 3, 2005

(30) Foreign Application Priority Data

Sep. 1, 2003 (TW) ............... 92124132 A

(51) Int. Cl.
*H01J 40/14* (2006.01)
*G09G 5/08* (2006.01)

(52) U.S. Cl. ...................... 250/221; 345/166
(58) Field of Classification Search ............... 250/221, 250/222.1; 345/163, 165, 166
See application file for complete search history.

(56) References Cited

U.S. PATENT DOCUMENTS

| 4,751,380 A | * | 6/1988 | Victor et al. ............. 250/221 |
|---|---|---|---|
| 4,752,769 A | | 6/1988 | Knaup et al. |
| 4,757,204 A | | 7/1988 | Baldwin et al. |
| 4,873,469 A | | 10/1989 | Young et al. |
| 5,066,855 A | | 11/1991 | Lee |
| 5,381,323 A | | 1/1995 | Osteen et al. |
| 5,393,978 A | | 2/1995 | Schwarz |
| 5,662,411 A | | 9/1997 | Haslam et al. |
| 5,677,529 A | | 10/1997 | Hofmann et al. |
| 5,818,337 A | | 10/1998 | Erisman |
| 6,175,309 B1 | | 1/2001 | Drake et al. |
| 2003/0080296 A1 | | 5/2003 | Raper et al. |

OTHER PUBLICATIONS

"CM 0.77 GI VX," Fresnel Technologies Inc. [online] (1995-2000) [retrieved prior to Nov. 2003] Retrieved from the internet, URL: http://www.fresneltech.com/pdf/CMO.77GIVX.pdf.
"Various PIR Arrays," Fresnel Technologies Inc. [online] (1991-2000) [retrieved prior to Nov. 2003] Retrieved from the internet, URL: http://www.fresneltech.com/pdf/variousArrays.pdf.

* cited by examiner

*Primary Examiner*—Georgia Epps
*Assistant Examiner*—Don Williams
(74) *Attorney, Agent, or Firm*—Winston Hsu

(57) ABSTRACT

A method for determining the compatibility of a working surface with an optical mouse having an optical sensor including (a) using the optical sensor to sense the optical characteristics of the working surface, (b) using a judging circuit to judge the compatibility of the working surface with the optical mouse according to the optical characteristics sensed by the optical sensor, (c) using the judging circuit to generate a judging signal according to the result obtained in step (b).

16 Claims, 6 Drawing Sheets

METHOD AND APPARATUS FOR REAL-TIME DETERMINING COMPATIBILITY OF A WORKING SURFACE WITH AN OPTICAL MOUSE

BACKGROUND OF INVENTION

1. Field of the Invention

The present invention relates to a method and an apparatus for judging the compatibility of a working surface, and more specifically, to a method and an apparatus for judging the compatibility of a working surface with an optical mouse.

2. Description of the Prior Art

An optical mouse generates cursor signals corresponding to its movement detected by optical reflection. This optical reflection is well known by the industry, thus only a brief description is given as follows.

Please refer to FIG. 1 showing a bottom view of a conventional optical mouse 10. As shown in FIG. 1, the optical mouse 10 has a bottom surface 12 with a hole 14 on it. Through the hole 14, the optical mouse 10 uses a light emitting diode (LED. Not shown in FIG. 1) to irradiate a working surface of the optical mouse, and scan and capture images of the working surface as well as compare the differences of the images. Whenever the captured image changes, a circuit built in the optical mouse 10 can calculate the displacement data of the optical mouse 10, convert the displacement data into axial displacement signals and then transmit the signals to a computer (not shown) via a cable 16. The cable 16 complies with standards such as COM, PS/2 or USB.

Please refer to FIG. 2 showing an assembly diagram 20 of the optical mouse 10. As shown in FIG. 2, the optical mouse 10 further includes an optical module 30 installed above the hole 14 on the bottom surface 12, a circuit board 40 installed above the optical module 30, an optical discriminating unit 42 installed above the circuit board 40, a LED 44 installed above the circuit board 40, and an optical mask 46 installed above the circuit board 40. The optical discriminating unit 42 is for capturing images of the working surface that the optical mouse 10 has passed by to analyze and judge the displacement of the optical mouse 10. The LED 44 is used as a light source of the optical discriminating unit 42, and the optical mask 46 is to prevent light from the LED 44 from directly entering into the optical discriminating unit 42. The optical module 30 includes a lens 32, a first reflection surface 34 and a second reflection surface 36. The circuit board 40 includes an aperture 48 positioned above the lens 32, and the optical discriminating unit 42 is installed above the aperture 48 of the circuit board 40. The first reflection surface 34 protrudes out of the aperture 48 so that it is located between the LED 44 and the optical discriminating unit 42.

Please refer to FIG. 2 along with FIG. 3 showing a side view 22 simplified from the assembly diagram 20 in FIG. 2. As shown in FIG. 3, the LED 44 is opposite to the first reflection surface 34 and generates a ray 27. In addition, since the shape of the mask 46 is designed to prevent the ray 27 from the LED 44 from directly entering into the optical discriminating unit 42, most of the ray 27 will go toward the first reflection surface 34 and be reflected downwards by the first reflection surface 34 to the second reflection surface 36. After being reflected by the second reflection surface, the ray 27 passes through the hole 14 on the bottom surface 12 and irradiates a working surface 50 of the optical mouse 10. The working surface 50 modulates the characteristics of the ray 27 and reflects the ray 27 to the lens 32 to be a reflected ray 28. The reflected ray 28 will be converged and focused on the optical discriminating unit 42 by the lens 32, and the optical discriminating unit 42 judges the movement of the optical mouse 10 according to the change of the reflected ray 28.

However, if the working surface 50 of the optical mouse 10 is highly transparent or in special color (e.g. a piece of glass or a glossy surface), the ray 27 incident on the working surface 50 cannot be completely reflected to the optical discriminating unit 42, so that the optical discriminating unit 42 cannot receive continuous images of the working surface 50, and the cursor of the optical mouse 10 cannot be in the right place. In this case, the working surface should be replaced to solve the problem, however, the user may not necessarily understand the characteristics of the optical discriminating unit 42 so that he is unable to locate the problem, and may even misunderstand that the problem is due to the optical mouse itself.

SUMMARY OF INVENTION

It is therefore a primary objective of the present invention to provide a method and an apparatus for real-time judging compatibility of a working surface with an optical mouse, in order to solve the problems mentioned above.

Briefly summarized, a method for determining the compatibility of a working surface with an optical mouse having an optical sensor including (a) using the optical sensor to sense the optical characteristics of the working surface, (b) using a judging circuit to judge the compatibility of the working surface with the optical mouse according to the optical characteristics sensed by the optical sensor, (c) using the judging circuit to generate a judging signal according to the results obtained in step (b).

A user can see the result displayed on a display device to judge whether the working surface is suitable for an optical mouse. If the cursor cannot move to where the user wants it to move, and the user realizes that the working surface is unsuitable for the optical mouse. The user will realize that the malfunction is not caused by the operating system nor is it a malfunction of the optical mouse itself. The user can then simply change the working surface, in order to solve the problem.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
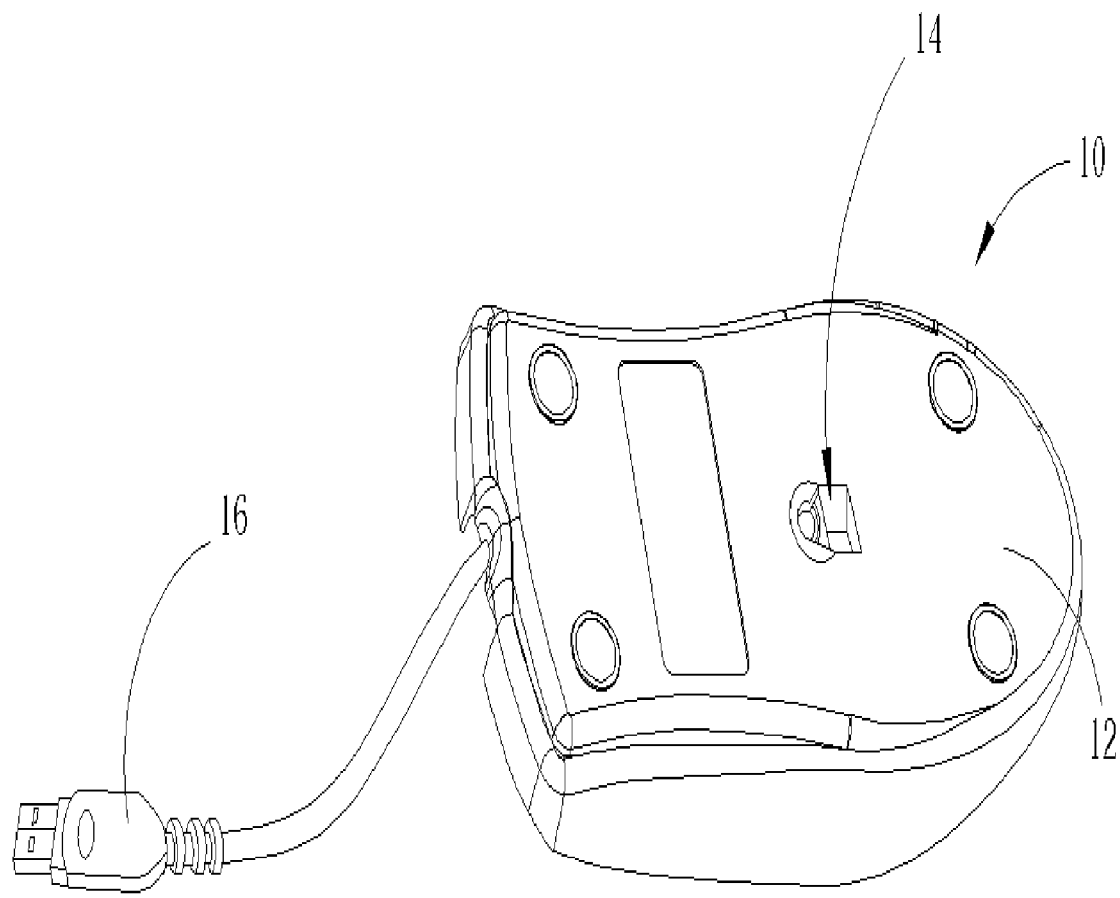
FIG. 1 is a bottom view of a conventional optical mouse.
Figure 2:
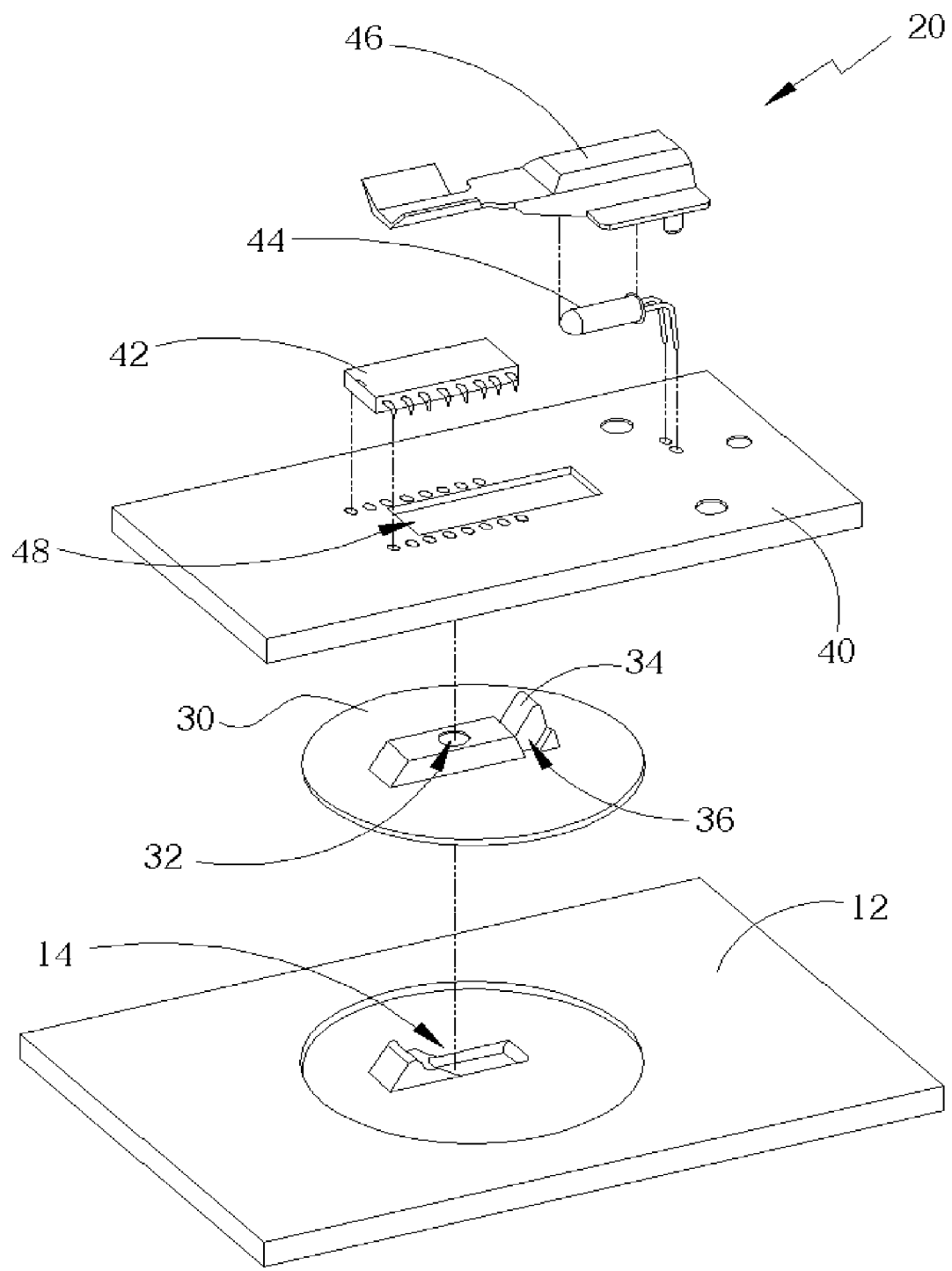
FIG. 2 is an assembly diagram of the conventional optical mouse.
Figure 3:
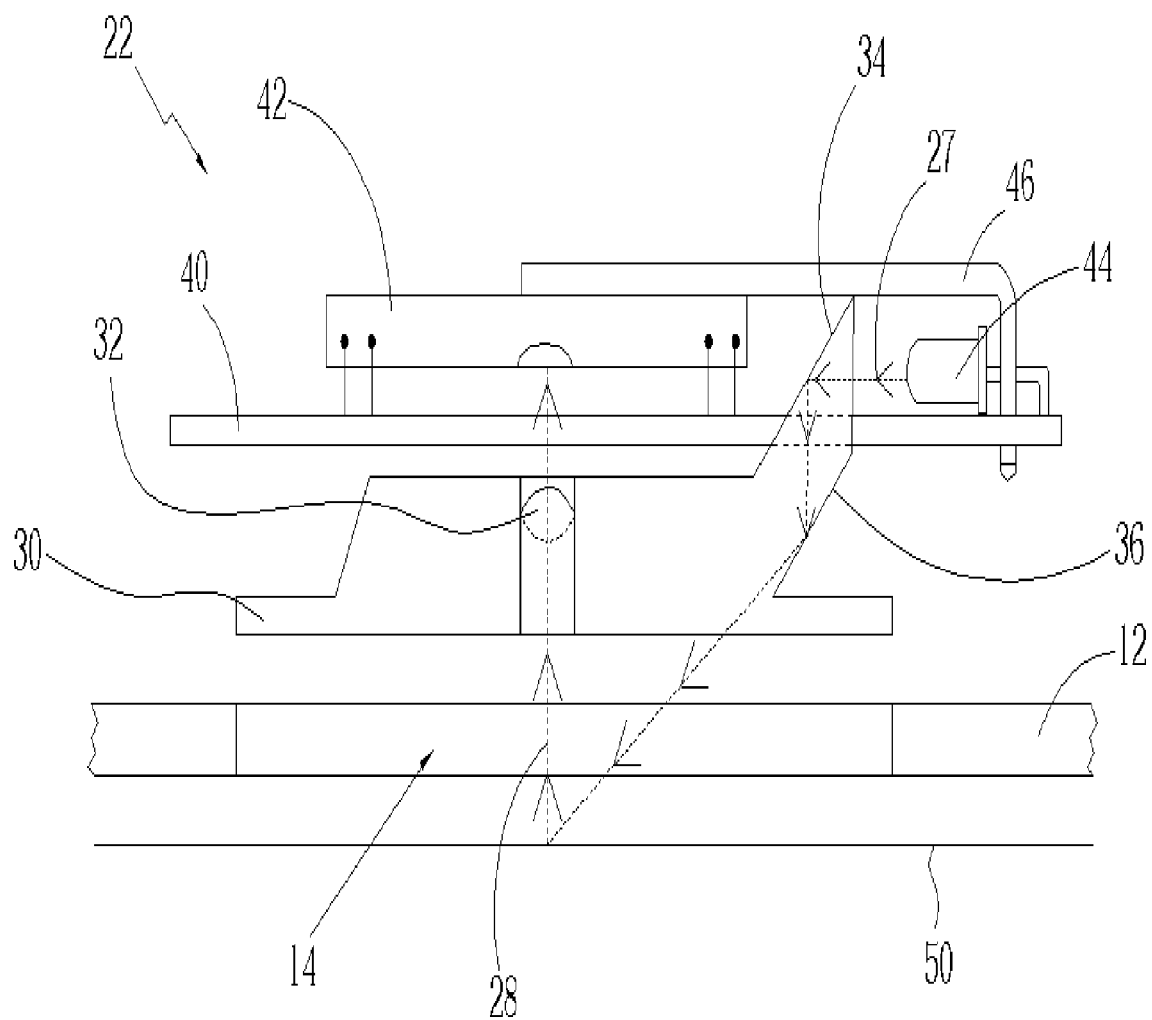
FIG. 3 is a side view simplified from the assembly diagram in FIG. 2.
Figure 4:
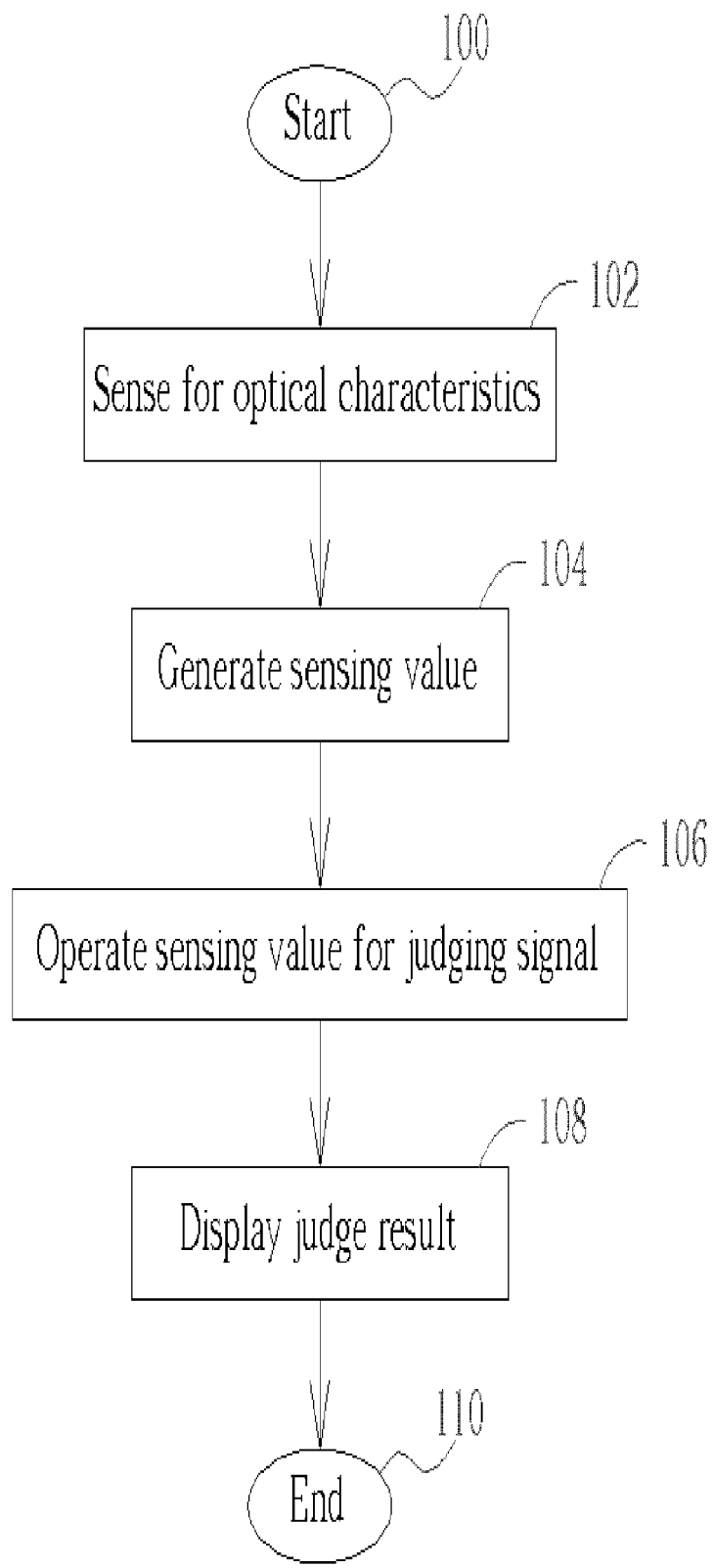
FIG. 4 is a flowchart of the method for real-time judging compatibility of a working surface with an optical mouse according to the present invention.

Please refer to FIG. 4 showing a flowchart of the method for real-time judging compatibility of a working surface with an optical mouse as follows:

Step 100: Start. The optical mouse generates a ray onto the working surface;

Step 102: An optical sensor captures the ray reflected by the working surface and senses the optical characteristics of the working surface;

Step 104: The optical sensor generates a sensing value according to the optical characteristics of the working surface;

Step 106: A judging circuit operates the sensing value to judge the compatibility of the working surface with the optical mouse and generate a judging signal;

Step 108: A display device display the result in Step 106;

Step 110: End.

In Step 102, the characteristics of the ray reflected from the working surface relates to the surface grain, reflectivity and transparency of the working surface. For instance, if the surface grain is too high in similarity (in 100 nanometer grade), the working surface is unsuitable for an optical mouse. In addition, high reflective (e.g. a mirror that completely reflects light) or high transparent (e.g. glass that light can fully pass through) surfaces are neither suitable for the optical mouse. Thus, the optical characteristics of the working surface can be known by detecting the ray reflected from the working surface. The sensing value in Step 104 relates to the optical characteristics of the working surface. As shown in FIG. 4, in Step 106 the judging circuit analyzes the sensing value to generate the judging signal. The judging circuit judges whether the working surface is suitable for the optical mouse according to the range where the sensing value is located in, and outputs the result as the judging signal. In general, the higher the sensing value, the more suitable the working surface for the optical mouse. For instance, in case the working surface is a high transparent surface (e.g. glass), the sensing value is approximately 0, and in case of some black surfaces, the sensing value is very small (approximately less than 10), so that it is known that these surfaces are not suitable for an optical mouse. In Step 108, the display device displays the result by light or message according to the judging signal generated in Step 106. The user knows the result from the display device, such as whether the working surface is suitable or not for the optical mouse.

Figure 5:
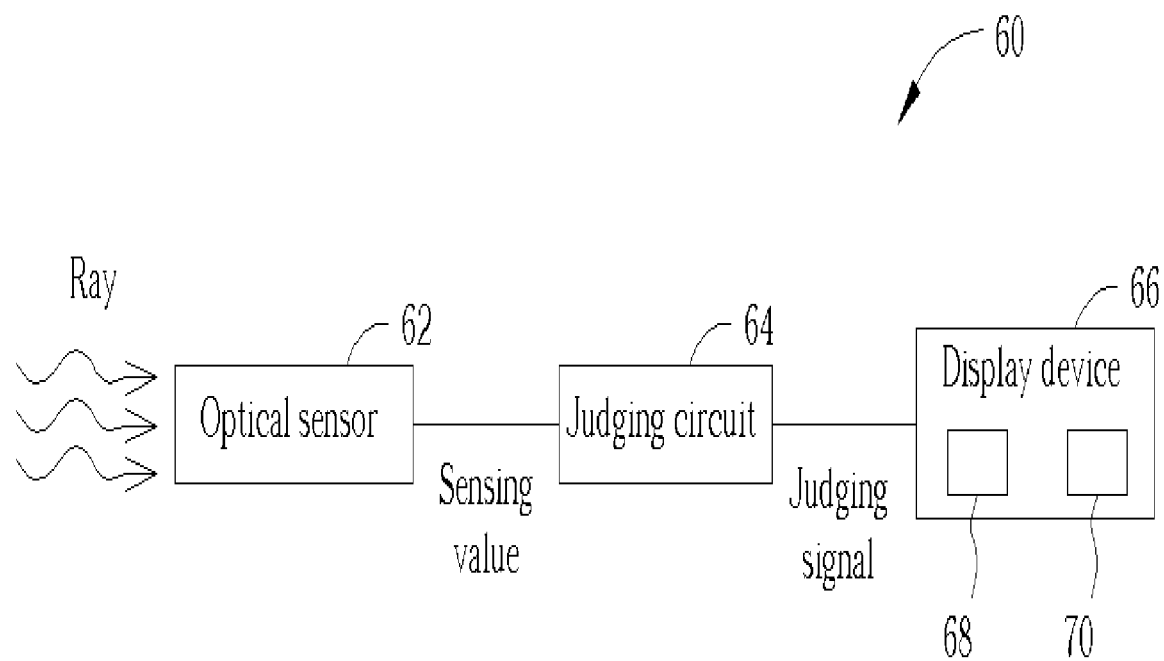
FIG. 5 illustrates the optical mouse according to the present invention.

Please refer to FIG. 5 showing an optical mouse 60 according to the present invention. The optical mouse 60 is for implementing the method shown in FIG. 4. The optical mouse 60 includes an optical sensor 62 for sensing the optical characteristics of the working surface of the optical mouse 60 and outputs the sensing value according to the optical characteristics, a judging circuit 64 electrically connects to the optical sensor 62 for receiving the sensing value from the optical sensor 62 and generating a corresponding judging signal, a display device 66 electrically connects to the judging circuit 64 to operate according to the judging signal. In this embodiment, the display device 66 includes a red LED 68 and a green LED 70.

The operation of the optical mouse 60 in FIG. 5 is described as follows. When a user moves the optical mouse 60, the optical mouse 60 generates the ray onto the working surface, and the optical sensor 62 scans the working surface that the optical mouse 60 has passed by and captures the ray reflected by the working surface. Since different working surfaces have different optical characteristics, and different optical characteristics are shown by the optical difference between the incident ray and the reflected ray, the optical sensor 62 can convert the optical characteristics into the corresponding sensing value and transmit it to the judging circuit 64. The judging circuit 64 includes a firmware, and a program code, which will judge the received sensing value. If the sensing value is located in a first range, the judging circuit 64 transmits a corresponding first judging signal to the display device 66. The display device 66 turns on the green LED 70 and turns off the red LED 68 according to the first judging signal, so that the user can know that the working surface is suitable for the optical mouse according to a predetermined definition of the LED. Similarly, if the sensing value is located in a second range, the judging circuit 64 transmits a corresponding second judging signal to the display device 66. The display device 66 turns on the red LED 68 and turns off the green LED 70 according to the second judging signal, so that the user can know that the working surface is not suitable for the optical mouse according to a predetermined definition of the LED. In the preferred embodiment of the present invention, the definition of the green and red LED can be marked on a side of them, such as "Please change mouse pad" on a side of the red LED 68.

The red LED and the green LED in the present embodiment described above are only an example, any type of display device, such as LCD, organic LED and so on could belong to the present invention.

Figure 6:
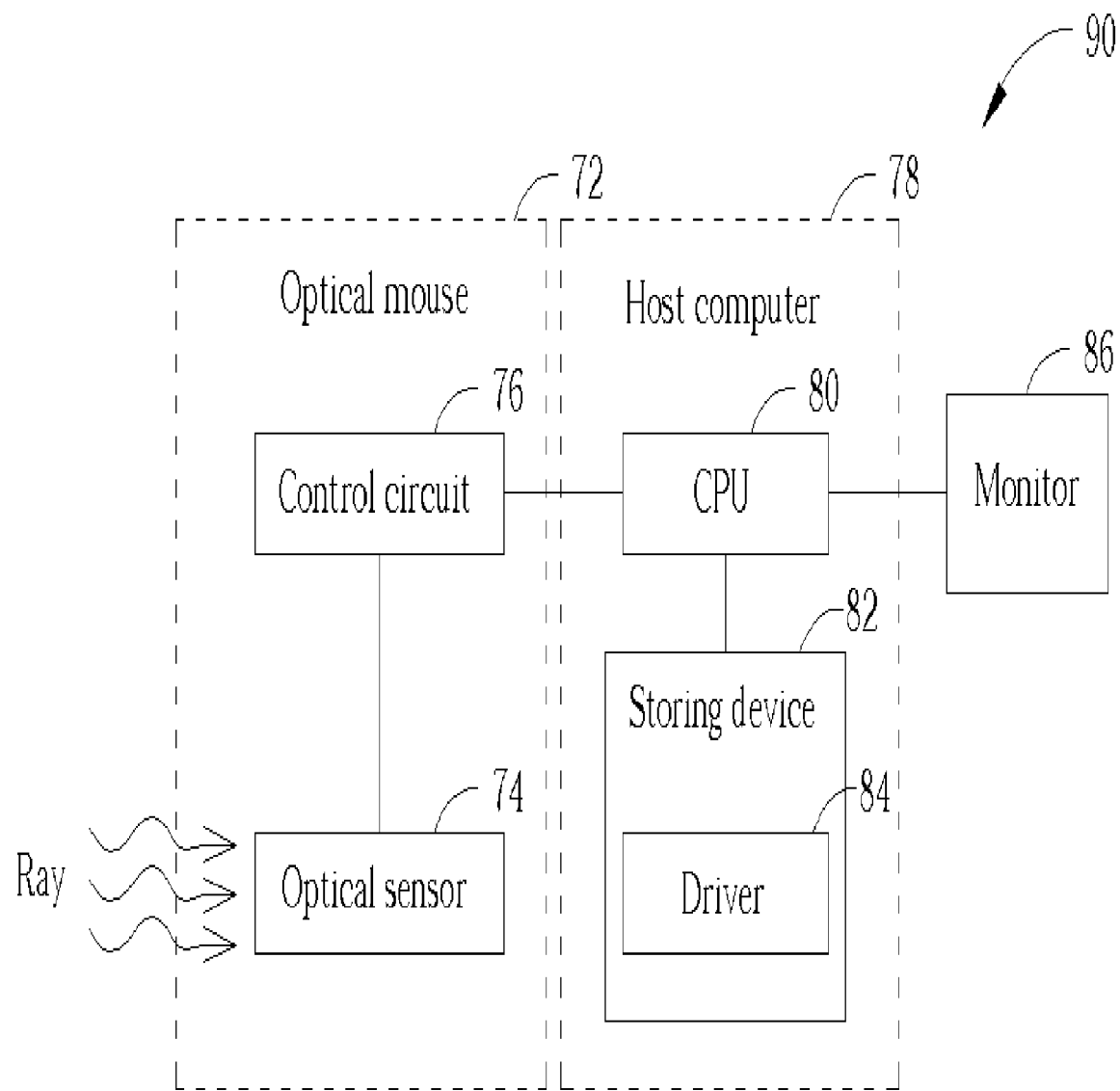
FIG. 6 illustrates a judging system according to the present invention.

Please refer to FIG. 6 showing a judging system 90 according to the present invention. The judging system 90 is for judging the compatibility of a working surface, which includes an optical mouse 72, a host computer 78 and a monitor 86 electrically connected to the host computer 78. The optical mouse 72 includes an optical sensor 74 for sensing the optical characteristics of the working surface of the optical mouse 72 and outputting a sensing value according to the optical characteristics, and a control circuit 76 for transmitting the sensing value to the host computer 78. The host computer 78 includes a central processing unit (CPU) 80 and a storing device 82 for storing a driver 84 to operate the sensing value.

The operation of the judging system 90 is described as follows. When a user moves the optical mouse 72, the optical sensor 74 of the optical mouse 60 scans the working surface that the optical mouse 72 has passed by and captures the optical characteristics of the working surface. As mentioned above, different working surfaces have different optical characteristics, and the optical sensor 74 converts the optical characteristics into the corresponding sensing value. Continuously, the optical mouse 72 transmits the sensing value and an axial displacement signal of the optical mouse 72 to the host computer 78 through the control circuit 76. After receiving the sensing value and the axial displacement signal of the optical mouse 72, the host computer 78 uses the CPU 80 to execute the driver 84 stored in the storing device 82 to operate the sensing value. Since the optical mouse continuously transmit sensing values to the host computer 78, the CPU 80 will record the sensing values and operate them by the driver 84 (e.g. calculate an average of the sensing values per unit time). The host computer 78 displays the result on the monitor 86 to notify the user that whether the working surface is suitable for the optical mouse 72. Since these sensing values are executed by the CPU 80, the compatibility of the working surface can be judged more precisely.

Please note that the results of the operation on the sensing value by the CPU 80 is not necessary to be display directly on the monitor 86, it can be displayed only when the user requires this kind of message. Moreover, the driver 84 is not limited to display the compatibility of the optical mouse 72, but also provides related information about the optical characteristics of the working surface, such as it indicates what kind of the working surface it is, showing reasons why the working surface is not suitable for the optical mouse, or recommending a proper working surface. This kind of information can be stored in the driver 84 or downloaded from the Internet through the driver 84. In such a manner, the user can know the compatibility of the working surface from the monitor 86 when something is wrong to the cursor, and judge if the malfunction is due to incompatibility of the working surface and prevent him/her from using other unsuitable working surfaces.

Those skilled in the art will readily observe that numerous modifications and alterations of the device and the method may be made while retaining the teachings of the invention. Accordingly, the above disclosure should be construed as limited only by the metes and bounds of the appended claims.

The invention claimed is:

1. A method for determining the compatibility of a working surface with an optical mouse, the optical mouse comprising an optical sensor, the method comprising:
   (a) utilizing the optical sensor to sense optical characteristics of the working surface and transmit a corresponding sensing value to a judging circuit;
   (b) utilizing the judging circuit to judge the compatibility of the working surface with the optical mouse and to generate a first judging signal if the sensing value falls within a first predefined range or to generate a second judging signal if the sensing value falls within a second predefined range, the first judging signal indicating compatibility of the working surface with the optical mouse and the second judging signal indicating incompatibility of the working surface with the optical mouse.

2. The method of claim 1 further comprises displaying the result of judge obtained in step (b) on a display device according to the judging signal.

3. The method of claim 2 wherein the display device comprises at least one light-emitting device (LED).

4. The method of claim 2 wherein the display device is a liquid crystal display (LCD) device installed on the optical mouse.

5. The method of claim 2 wherein the display device is a monitor of a computer system.

6. The method of claim 1 wherein the judging circuit is a control circuit of the optical mouse.

7. The method of claim 1 further comprises utilizing the optical sensor to generate the sensing value according to the optical characteristics of the working surface sensed by the optical sensor.

8. The method of claim 7 wherein the judging circuit is a central processing unit (CPU) of a computer system, and step (b) further comprises utilizing the judging circuit to operate the sensing value, in order to judge the compatibility of the working surface with the optical mouse.

9. The method of claim 1 wherein the optical mouse further comprises a control circuit electrically connected to the optical sensor.

10. The method of claim 9 further comprising the control circuit transmitting an axial displacement signal to a host computer.

11. An optical mouse used for determining the compatibility of a working surface, the optical mouse comprising:
    an optical sensor for sensing the optical characteristics of the working surface to generate a sensing value;
    a judging circuit electrically connected to the optical sensor for generating a first judging signal if the sensing value falls within a first predefined range or a second judging signal if the sensing value falls within a second predefined range, the first judging signal indicating compatibility of the working surface with the optical mouse and the second judging signal indicating incompatibility of the working surface with the optical mouse; and
    a display device electrically connected to the judging circuit for displaying the compatibility of the working surface with the optical mouse according to the first or second judging signal.

12. The optical mouse of claim 11 wherein the judging circuit is a control circuit of the optical mouse.

13. The optical mouse of claim 11 wherein the display device comprises at least one LED installed on the optical mouse.

14. The optical mouse of claim 11 wherein the display device is an LCD device installed on the optical mouse.

15. The optical mouse of claim 11 further comprising a control circuit electrically connected to the optical.

16. The optical mouse of claim 15 wherein the control circuit transmits an axial displacement signal to a host computer.

* * * * *